United States Patent
Jung

(10) Patent No.: US 11,415,193 B2
(45) Date of Patent: Aug. 16, 2022

(54) MULTI-CHAMBER TYPE AIR SPRING DEVICE

(71) Applicant: HYUNDAI MOBIS Co., Ltd., Seoul (KR)

(72) Inventor: Joon Chai Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 234 days.

(21) Appl. No.: 16/813,662

(22) Filed: Mar. 9, 2020

(65) Prior Publication Data

US 2021/0033161 A1 Feb. 4, 2021

(30) Foreign Application Priority Data

Jul. 30, 2019 (KR) ........................ 10-2019-0092237

(51) Int. Cl.
| | | |
|---|---|---|
| *F16F 9/04* | (2006.01) | |
| *B60G 17/052* | (2006.01) | |
| *B60G 17/005* | (2006.01) | |

(52) U.S. Cl.
CPC ............ *F16F 9/049* (2013.01); *B60G 17/005* (2013.01); *B60G 17/0528* (2013.01); *B60G 2202/416* (2013.01)

(58) Field of Classification Search
CPC ...... F16F 9/04; F16F 9/46; F16F 9/461; F16F 9/464; F16F 9/049; F16K 27/029; B60G 2202/42; B60G 17/0528; B60G 2202/416; B60G 17/005
See application file for complete search history.

(56) References Cited

U.S. PATENT DOCUMENTS

| | | | | |
|---|---|---|---|---|
| 4,170,279 | A | * 10/1979 | Pelletier | ............... B60G 17/005 137/118.01 |
| 4,669,710 | A | * 6/1987 | Horvat | ................ F16F 15/0275 267/64.21 |
| 5,076,606 | A | * 12/1991 | Takahashi | .............. B60G 21/06 280/124.161 |
| 5,219,152 | A | * 6/1993 | Derrien | .............. B60G 17/0416 267/118 |
| 6,698,730 | B2 | * 3/2004 | Easter | ................ B60G 17/0528 267/64.28 |
| 7,644,943 | B2 | * 1/2010 | Hayes | ................. B60G 17/0521 280/124.157 |
| 10,369,855 | B2 | * 8/2019 | Moulik | .................. F16F 9/0472 |
| 2004/0055839 | A1 | * 3/2004 | Meret | .................... B62K 25/08 188/300 |
| 2017/0122266 | A1 | 5/2017 | Park | |

(Continued)

FOREIGN PATENT DOCUMENTS

| | | |
|---|---|---|
| CN | 102261417 | 11/2011 |
| CN | 110486478 A | * 11/2019 |
| CN | 112145753 A | * 12/2020 |

(Continued)

*Primary Examiner* — Paul N Dickson
*Assistant Examiner* — Maxwell L Meshaka
(74) *Attorney, Agent, or Firm* — H.C. Park & Associates, PLC

(57) ABSTRACT

A multi-chamber type air spring device includes a chamber part and a valve part. The chamber part is partitioned into spaces. The valve part is configured to control movement of air through an internal boundary of the chamber part via valves. In a powered-off state of the valve part, the valves are in different opened/closed states from one another.

20 Claims, 7 Drawing Sheets

(56) References Cited

U.S. PATENT DOCUMENTS

2019/0346065 A1* 11/2019 Byle .................... F16K 27/003
2020/0376915 A1* 12/2020 Roessle ................ F16F 9/3292

FOREIGN PATENT DOCUMENTS

| CN | 112324955 A | * | 2/2021 | |
|---|---|---|---|---|
| DE | 19748243 A1 | * | 5/1999 | ........... B60G 17/005 |
| JP | 2015-186932 | | 10/2015 | |
| KR | 10-2017-0050324 | | 5/2017 | |
| KR | 10-1944993 | | 2/2019 | |
| KR | 102260127 B1 | * | 6/2021 | |

* cited by examiner

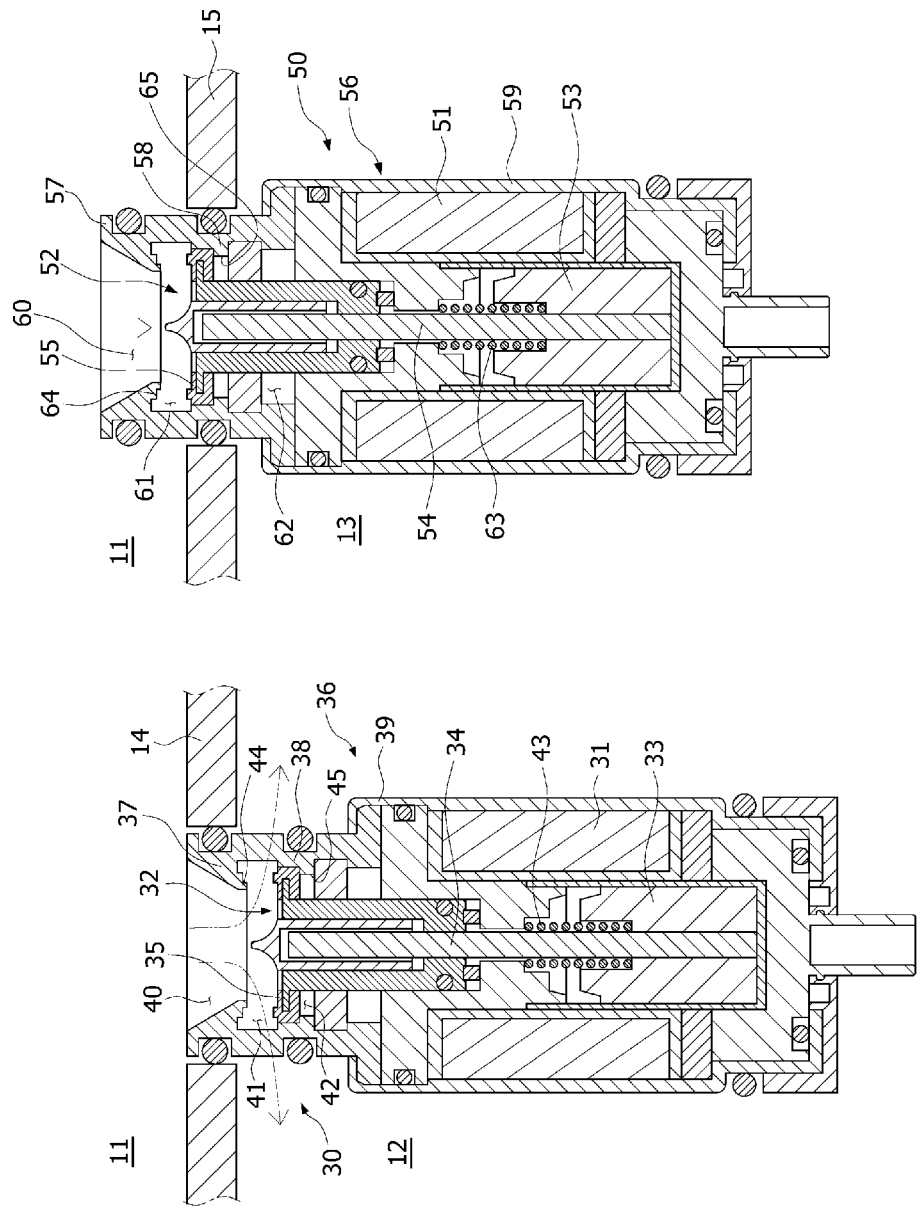

MULTI-CHAMBER TYPE AIR SPRING DEVICE

CROSS-REFERENCE TO RELATED APPLICATION

This application claims priority to and the benefit of Korean Patent Application No. 10-2019-0092237, filed Jul. 30, 2019, which is hereby incorporated by reference for all purposes as if fully set forth herein.

BACKGROUND

Field

Exemplary embodiments generally relate to a multi-chamber type air spring device, and more particularly, to a multi-chamber type air spring device in which valves in an air chamber open/close in an opposite way even when no power is supplied.

Discussion

In general, a suspension system is mounted to absorb vibration or shock applied to a vehicle in operation from the road and is an important device for preventing (or at least mitigating) damage to goods loaded on (or in) the vehicle, as well as components of the vehicle itself. In addition, a suspension system not only provides a more comfortable ride to passengers, but also affects vehicle alignment, braking, handling, stability, and traction among other vehicle dynamics.

Suspension systems typically make use of at least one spring, such as an air, coil, leaf, torsion, etc., spring, to compensate for road conditions. In the case of a suspension system including an air spring, a compressor is typically operated by an engine or motor to provide air as biasing medium. Air compressed by the compressor is stored in a main air tank through, for instance, a water trap, a check valve, and/or the like. The internal pressure of the main air tank can be regulated in a predetermined range by a pressure regulator, and a safety valve for removing an abnormality in air pressure may be installed on a side of the main air tank. The air of the main air tank is usually supplied to the air spring of the suspension system through an air pipe, a leveling valve, a surge tank, and/or the like. Such an air spring will absorb energy (e.g., shock) using the compression elasticity of the air. Furthermore, an air spring can not only be controlled to regulate its internal air pressure to substantially maintain the height of the vehicle even though a load of the vehicle body changes, but can change (e.g., dynamically change) the strength of the spring (e.g., spring rate) in proportion to the load. Therefore, the ride quality of the vehicle can be maintained and/or controlled even when the vehicle is loaded or empty.

Conventionally, an air spring may have a plurality of air chambers formed therein, and the air chambers may regulate the pressure of the air through installation of valves. Since, however, power is to be supplied to the valve at all times for operation, power consumption is increased. Therefore, there is a need for a structure capable of addressing this issue.

The above information disclosed in this section is only for understanding the background of the inventive concepts, and, therefore, may contain information that does not form prior art.

SUMMARY

Some aspects provide a multi-chamber type air spring device in which valves installed in an air chamber are capable of being opened/closed in an opposite way even when no power is supplied.

Some aspects provide a gas spring in which valves between gas chambers are capable of being in opposite opened conditions even in a powered-off state.

Additional aspects will be set forth in the detailed description which follows, and, in part, will be apparent from the disclosure, or may be learned by practice of the inventive concepts.

According to some aspects, a multi-chamber type air spring device includes a chamber part and a valve part. The chamber part is partitioned into spaces. The valve part is configured to control movement of air through an internal boundary of the chamber part via valves. In a powered-off state of the valve part, the valves are in different opened/closed states from one another.

In an exemplary embodiment, the chamber part may include: a first chamber configured to store air; a second chamber connected to the first chamber; and a third chamber connected to the first chamber.

In an exemplary embodiment, the valves may include: a first valve configured to control movement of air between the first chamber and the second chamber; and a second valve configured to control movement of air between the first chamber and the third chamber.

In an exemplary embodiment, an end of the first valve may be mounted at a different distance from the internal boundary than a corresponding end of the second valve, and, in a powered-on state of the valve part, the first and second valves may be in different opened/closed states.

In an exemplary embodiment, no power may be supplied to the first and second valves in the powered-off state, and, in the powered-off state, the opened/closed states of the first and second valves may be opposite one another.

In an exemplary embodiment, the first and second valves may be solenoid valves.

In an exemplary embodiment, the first valve may include a first coil, a first moving part, and a first housing part. The first coil may be configured to generate a magnetic force in response to applied power. The first moving part may face the first coil and may be configured to move linearly in response to operation of the first coil. The first housing part may cover the first coil and the first moving part. The first housing part may include a first flow path, a second flow path, and a third flow path. The first flow path may be open and formed at a side facing the first moving part. The second flow path may form a passage through which air may be selectively passed through a side surface of the first housing part. The third flow path may be spaced apart from the second flow path. The third flow path may form a passage through which air may pass through the side surface of the first housing part.

In an exemplary embodiment, the first moving part may include a first flange, a first connecting shaft member, and a first opening/closing member. The first flange may be configured to move linearly in response to the operation of the first coil. The first connecting shaft member may extend in a longitudinal direction of the first housing part and may be fixed to the first flange. The first connecting shaft member may be configured to move with the first flange. The first opening/closing member may be fixed to the first connecting shaft member and may be configured to open/close an interface between the first flow path and the second flow path.

In an exemplary embodiment, the first housing part may include a first housing, a second housing, and a third housing. The first housing may cover the first flow path and may include a first stepped part. The first opening/closing member may be configured to abut against the first stepped part in a forward position of the first connecting shaft member. The second housing may be adjacent to the first flow path with the second flow path interposed therebetween and may include a second stepped part. The first opening/closing member may be configured to abut against the second stepped part in a rearward position of the first connecting shaft member. The third housing may be adjacent to the second flow path with the third flow path interposed therebetween. The third housing may cover the first flange and the first coil.

In an exemplary embodiment, the chamber part may include a first partition partitioning the first chamber and the second chamber. The first partition may interface with a side surface of the first housing. The first moving part may be configured to open/close the interface between the first flow path and the second flow path to regulate the movement of the air between the first chamber and the second chamber.

In an exemplary embodiment, the second valve may include a second coil, a second moving part, and a second housing part. The second coil may be configured to generate a magnetic force in response to applied power. The second moving part may face the second coil and may be configured to move linearly in response to operation of the second coil. The second housing part may cover the second coil and the second moving part. The second housing part may include a first passage, a second passage, and a third passage. The first passage may be open and may be formed at a side facing the second moving part. The second passage may form a passage through which air may pass through a side surface of the second housing part. The third passage may be spaced apart from the second passage. The third passage may form a passage through which air may be selectively passed through the side surface of the second housing part.

In an exemplary embodiment, the second moving part may include a second flange, a second connecting shaft member, and a second opening/closing member. The second flange may be configured to move linearly in response to the operation of the second coil. The second connecting shaft member may extend in a longitudinal direction of the first second housing part and may be fixed to the second flange. The second connecting shaft member may be configured to move with the second flange. The second opening/closing member may be fixed to the second connecting shaft member and may be configured to open/close an interface between the second passage and the third passage.

In an exemplary embodiment, the second housing part may include a first body, a second body, and a third body. The first body may cover the first passage and may include a first stepped part. The second opening/closing member may be configured to abut against the first stepped part in a forward position of the second connecting shaft member. The second body may be adjacent to the first passage with the second passage interposed therebetween and may include a second stepped part. The second opening/closing member may be configured to abut against the second stepped part in a rearward position of the second connecting shaft member. The third body may be adjacent to the second passage with the third passage interposed therebetween. The third body may cover the second flange and the second coil.

In an exemplary embodiment, the chamber may include a second partition partitioning the first chamber and the third chamber. The second partition may interface with a side surface of the second body. The second moving part may be configured to open/close the interface between the second passage and the third passage to regulate the movement of the air between the first chamber and the third chamber.

According to some aspects, a gas spring may include a first chamber, a second chamber, a third chamber, a first valve, and a second valve. The second chamber interfaces with the first chamber. The third chamber interfaces with the first chamber and is adjacent to the second chamber. The first valve is configured to control movement of gas through a first boundary between the first chamber and the second chamber via a first structure. The second valve is configured to control movement of gas through a second boundary between the first chamber and the third chamber via a second structure. The second structure is equivalent to the first structure. In a powered-off state of the gas spring, an open condition of the first valve is opposite an open condition of the second valve.

In an exemplary embodiment, the open condition of the first valve may be controlled, at least in part, according to a first distance of an end of the first valve from the first boundary. The open condition of the second valve may be controlled, at least in part, according to a second distance of a corresponding end of the second valve from the second boundary. The second distance may be different from the first distance.

According to various exemplary embodiments, even though power is not supplied to a multi-chamber type air spring, first and second valves of the multi-chamber type air spring may be opened/closed in an opposite way. Further, first and second chambers of the multi-chamber type air spring may be connected to each other and used in a basic mode, making it possible to reduce power consumption.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIGS. 3A and 3B are cross-sectional views illustrating the first valve and a second valve of the multi-chamber type air spring device of FIG. 1 in a powered-off state according to various exemplary embodiments.

DETAILED DESCRIPTION OF SOME EXEMPLARY EMBODIMENTS

Figure 1:
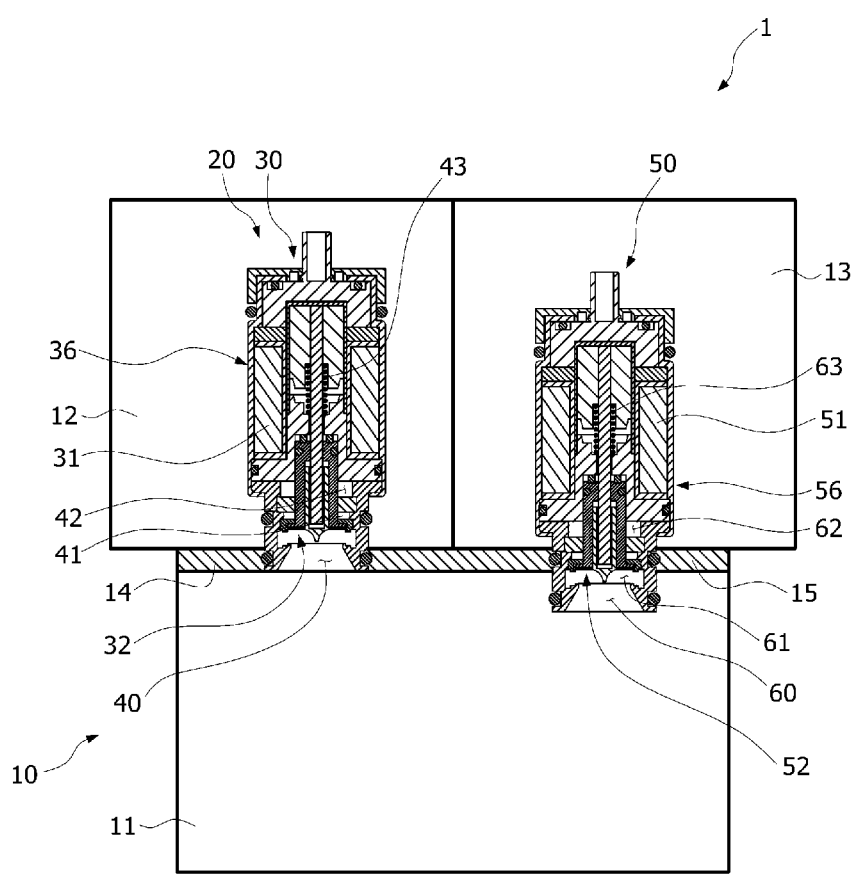
FIG. 1 is a cross-sectional view illustrating a multi-chamber type air spring device according to some exemplary embodiments.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, various exemplary embodiments of a multi-chamber type air spring device will be described with reference to the accompanying drawings.

Figure 2:
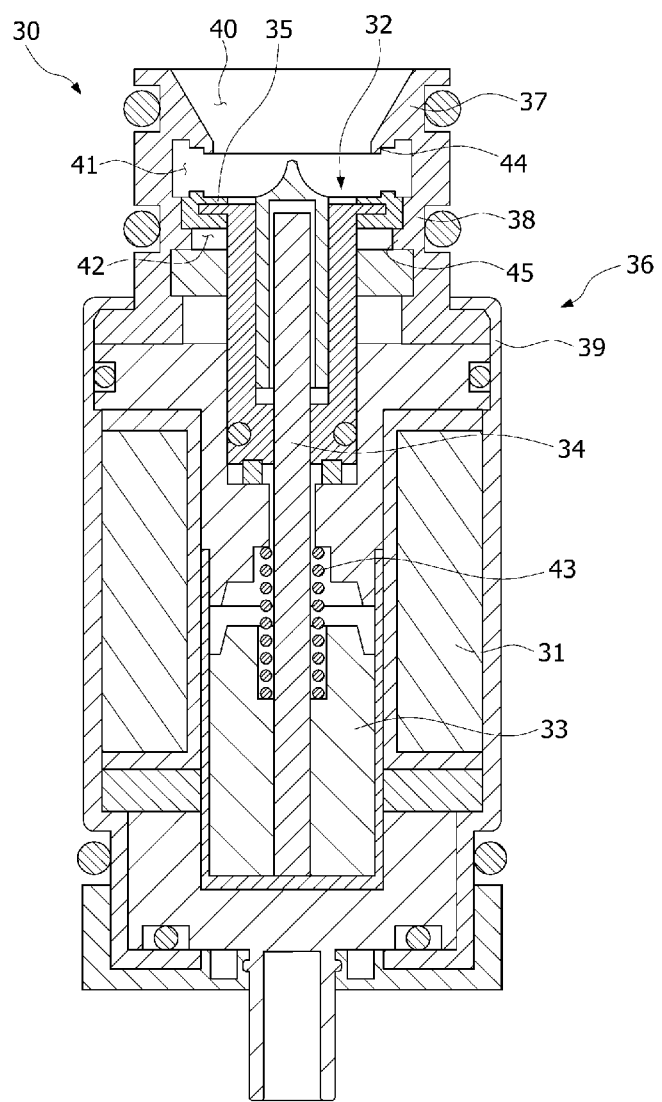
FIG. 2 is a cross-sectional view illustrating a first valve of the multi-chamber type air spring device of FIG. 1 according to some exemplary embodiments.
Figure 4A:
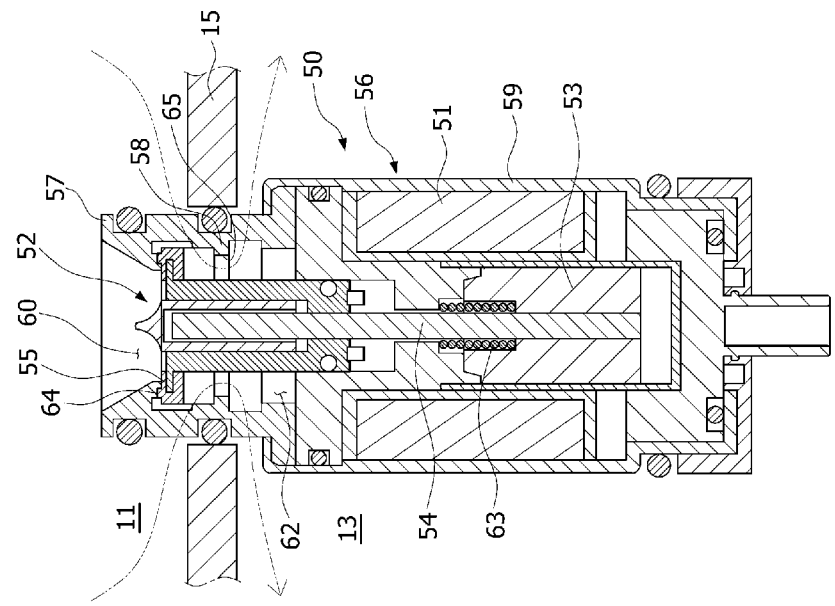
FIGS. 4A and 4B are cross-sectional views illustrating the first and second valves of the multi-chamber type air spring device of FIG. 1 in a powered-on state according to various exemplary embodiments.
Figure 4B:
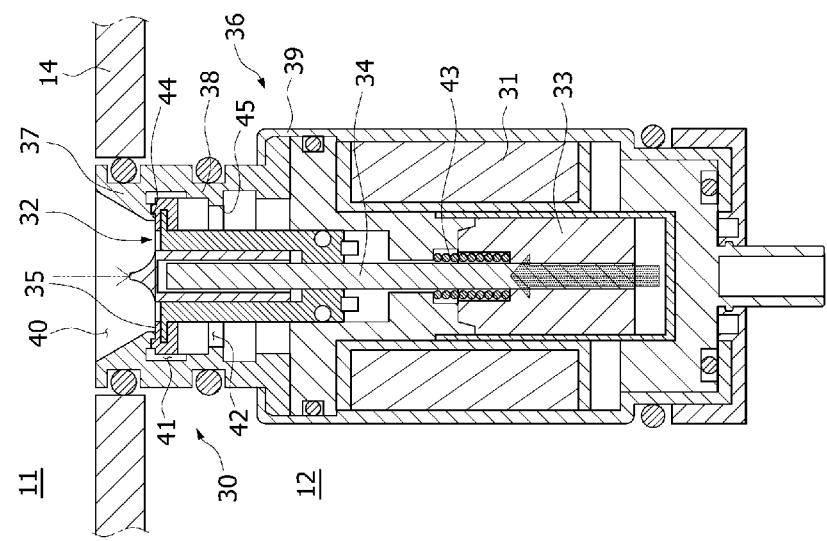
Figure 5:
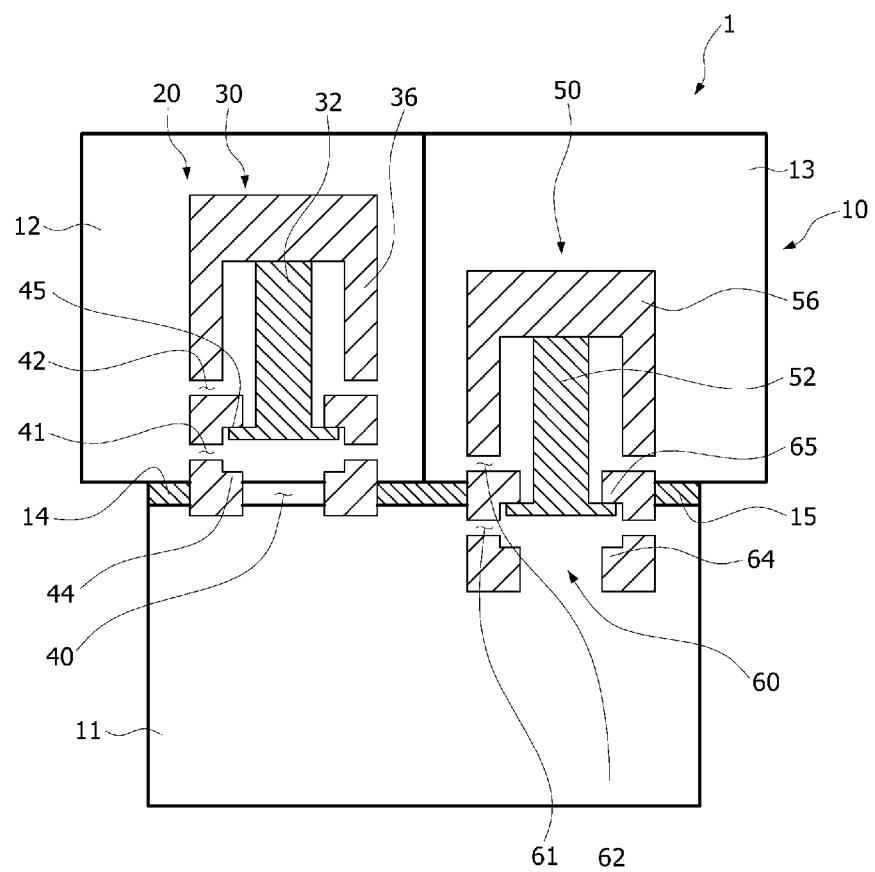
FIG. 5 is a cross-sectional view schematically illustrating the multi-chamber type air spring device of FIG. 1 according to some exemplary embodiments.
Figure 6A:
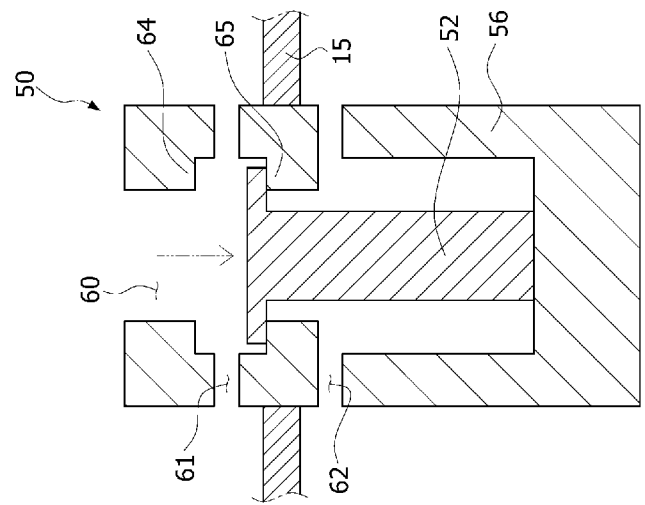
FIGS. 6A and 6B are cross-sectional views schematically illustrating the first and second valves of the multi-chamber type air spring device of FIG. 5 in a powered-off state according to various exemplary embodiments.
Figure 6B:
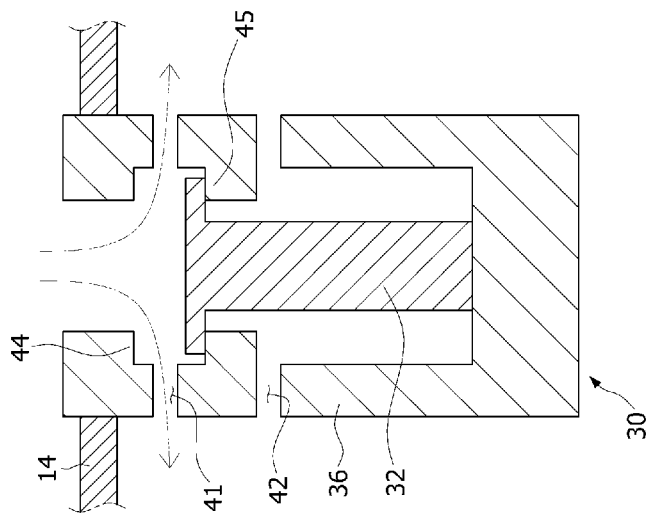
Figure 7A:
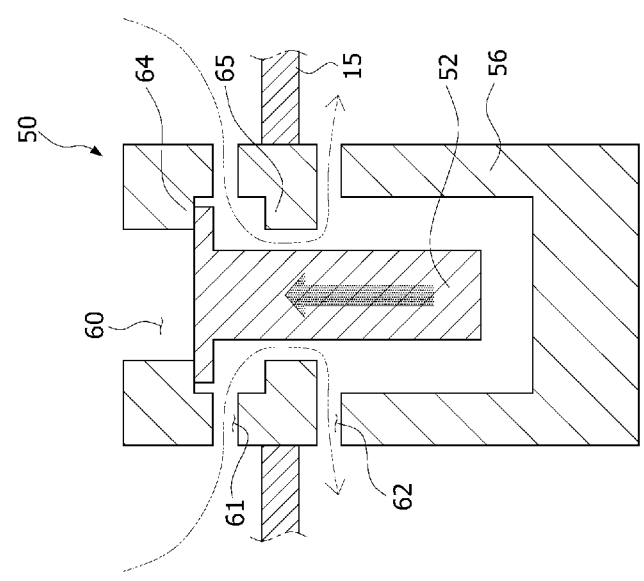
FIGS. 7A and 7B are cross-sectional views schematically illustrating the first and second valves of the multi-chamber type air spring device of FIG. 5 in a powered-on state according to various exemplary embodiments.
Figure 7B:
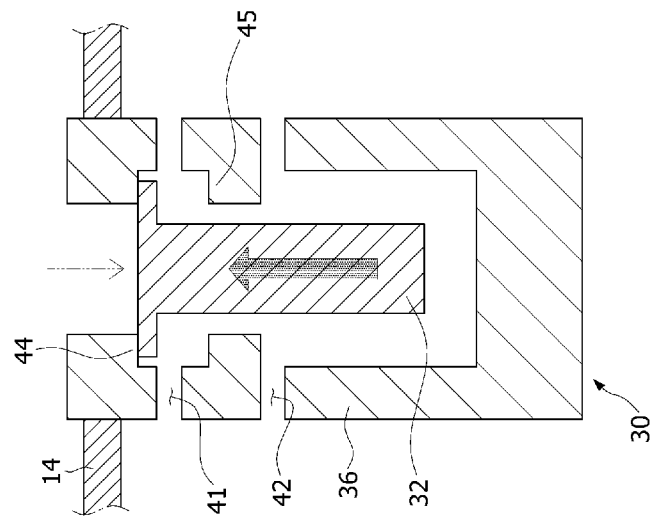

FIG. 1 is a cross-sectional view illustrating a multi-chamber type air spring device according to some exemplary embodiments. FIG. 2 is a cross-sectional view illustrating a first valve of the multi-chamber type air spring device of FIG. 1 according to some exemplary embodiments. FIGS. 3A and 3B are cross-sectional views illustrating the first valve and a second valve of the multi-chamber type air spring device of FIG. 1 in a powered-off state according to various exemplary embodiments. FIGS. 4A and 4B are cross-sectional views illustrating the first and second valves of the multi-chamber type air spring device of FIG. 1 in a powered-on state according to various exemplary embodiments. FIG. 5 is a cross-sectional view schematically illustrating the multi-chamber type air spring device of FIG. 1 according to some exemplary embodiments. FIGS. 6A and 6B are cross-sectional views schematically illustrating first and second valves of the multi-chamber type air spring device of FIG. 5 in a powered-off state according to various exemplary embodiments. FIGS. 7A and 7B are cross-sectional views schematically illustrating first and second valves of the multi-chamber type air spring device of FIG. 5 in a powered-on state according to various exemplary embodiments.

As illustrated in FIGS. 1, 2, 3A, 3B, 4A, 4B, 5, 6A, 6B, 7A, and 7B, a multi-chamber type air spring device 1 according to some exemplary embodiments includes a chamber part (or chamber) 10 partitioned into a plurality of spaces and a valve part 20 installed at (or in) an inner boundary of the chamber part 10 so as to control movement of air or other type of compressible gas. When no power is supplied to the valve part 20, valves included in the valve part 20 are opened/closed in different manners.

The chamber part 10 can be modified in various manners, as long as the chamber part 10 includes a plurality of spaces for storing air. The chamber part 10, according to some exemplary embodiments, includes a first chamber 11 having a space for storing air therein, a second chamber 12 connected to the first chamber 11, and a third chamber 13 installed next to the second chamber 12 and connected to the first chamber 11.

The second chamber 12 and the third chamber 13 are positioned over (or adjacent to a side of) the first chamber 11, and the second chamber 12 and the third chamber 13 are installed in parallel to each other in a horizontal direction. The first chamber 11 and the second chamber 12 are partitioned by a first partition 14, and the first chamber 11 and the third chamber 13 are partitioned by a second partition 15.

Various types of valves may be used as the valve part 20, as long as the valve part 20 is installed at the inner boundary of the chamber part 10 so as to control movement of air. The valves included in the valve part 20, according to some exemplary embodiments, are opened/closed in different manners when no power is supplied. For instance, the valves constituting the valve part 20 may be configured in the same manner, but the movement of air may be set in different manners depending on the installation position of the valve part 20. Therefore, the movement of air through each of the valves is differently set even by supply or removal of power (e.g., single power).

The valve part 20, according to some exemplary embodiments, includes a first valve 30 and a second valve 50. The first valve 30 is installed at the boundary between the first and second chambers 11 and 12 so as to control movement of air therebetween, and the second valve 50 is installed at the boundary between the first and third chambers 11 and 13 so as to control movement of air therebetween.

The first and second valves 30 and 50 are mounted at different positions, and opened and closed in different manners when power is/is not supplied. The first valve 30 is installed in such a state that an end of a first housing part 36 connected to a first stepped part 44 of the first valve 30 is locked (or coupled) to the first partition 14. The second valve 50 is installed in such a state that a second housing part 56 connected to a second stepped part 65 of the second valve 50 is locked to the second partition 15. Therefore, the first and second valves 30 and 50 having the same structure may pass/cut off (or block) air flow in the opposite way when the same power is supplied or removed.

The first and second valves 30 and 50 are, for instance, solenoid valves. When no power is supplied to the first and second valves 30 and 50, the opening/closing operations of the first and second valves 30 and 50 are performed in an opposite way. For instance, when no power is applied to the first and second valves 30 and 50, the first valve 30 is opened, and the second valve 50 is closed. On the other hand, when power is applied to the first and second valves 30 and 50, the first valve 30 is closed, and the second valve 50 is opened.

The opening/closing operations of the first and second valves 30 and 50 mounted at different positions are performed in the opposite way when power is/is not applied. Therefore, when the respective volumes of the first and second chambers 11 and 12 are set to as the volume of the chamber part 10 in a basic mode, the first and second valves 30 and 50 are mounted at different positions. Therefore, when no power is supplied to the valve part 20, the first valve 30 is opened, and the second valve 50 is closed to minimize (or at least reduce) power consumption.

The first valve 30, according to some exemplary embodiments, includes a first coil 31, a first moving part 32, the first housing part 36, a first flow path 40, a second flow path 41, a third flow path 42, and a first spring 43.

The first coil 31 generates a magnetic force as power is supplied. The first coil 31, according to some exemplary embodiments, is implemented as an electromagnet and installed in the first housing part 36 in the circumferential direction.

The first moving part 32 is installed at a position facing the first coil 31, and linearly moved in a top-to-bottom (or longitudinal) direction (based on FIG. 2) by the operation of the first coil 31. The first moving part 32, according to some exemplary embodiments, includes a first flange 33, a first connecting shaft member 34, and a first opening/closing member 35. The first flange 33 is linearly moved by the operation of the first coil 31, the first connecting shaft member 34 is fixed to the first flange 33, moved with the first flange 33, and extended in the longitudinal direction of the first housing part 36. The first opening/closing member 35 is fixed to the first connecting shaft member 34 and opens/closes the first flow path 40.

The first moving part 32 has a T-shaped structure, and the first flange 33 is moved in the top-to-bottom direction by magnetization of the first coil 31. The first connecting shaft member 34 is formed in a rod shape and extended in the top-to-bottom direction. The first opening/closing member 35 is positioned between the first stepped part 44 and the second stepped part 45 of the first housing part 36.

The first housing part 36 can be modified in various shapes, as long as the first housing part 36 is installed in a shape to cover the first coil 31 and the first moving part 32 and includes the first flow path 40, which is open and formed on one side facing the first moving part 32.

The first housing part 36, according to some exemplary embodiments, includes a first housing 37, a second housing 38, and a third housing 39. The first housing 37 is installed in a shape to cover the first flow path 40 and has the first stepped part 44 to which the first opening/closing member 35 moved in a forward direction (e.g., upward direction in FIG. 2) is locked (or abutted against), such as illustrated in FIG. 4A. The second housing 38 is installed next to the first flow path 40 with the second flow path 41 interposed therebetween, and has the second stepped part 45 to which the first opening/closing member 35 moved in a backward (or rearward) direction (e.g., downward direction in FIG. 2) is locked, such as illustrated in FIG. 3A. The third housing 39 is installed next to the second flow path 41 with the third flow path 42 interposed therebetween, and installed in a shape to cover the first flange 33 and the first coil 31.

The first flow path 40, serving as a passage through which air is moved, is formed at the top of the first housing 37, and is opened/closed by the first opening/closing member 35. As seen in FIG. 4A, since the first opening/closing member 35 is locked to the first stepped part 44 protruding to the inside of the first housing 37, the first flow path 40 is closed.

The second flow path 41, serving as a passage through which air is moved, is formed at the bottom (based on FIG. 2) of the first housing 37 along the circumference thereof. The second flow path 41, according to some exemplary embodiments, forms a passage through which air is moved through a side surface of the first housing part 36.

The second housing 38 is positioned under the first housing 37, and has the second stepped part 45 to which the first opening/closing member 35 is locked when the first opening/closing member 35 is moved downward, as seen in FIG. 3A. The second stepped part 45 protruding to the inside of the second housing 38 is installed at a position facing the first stepped part 44 with the first opening/closing member 35 interposed therebetween.

The third flow path 42 is installed at a position spaced apart from the second flow path 41, and forms a passage through which air is moved through a side surface of the first housing part 36. The third flow path 42, according to some exemplary embodiments, is positioned under the second flow path 41, and forms a passage through which air is moved along the circumference of the third housing 39.

The first partition 14, for partitioning the first and second chambers 11 and 12, is positioned at a side surface of the first housing 37, and the movement of air is regulated while the first flow path 40 is opened/closed by the movement of the first moving part 32. Since the first partition 14 is installed in a shape to cover the outside of the first housing 37, the air in the first chamber 11 may be moved into the second chamber 12 through the first flow path 40.

The second valve 50, according to some exemplary embodiments, includes a second coil 51, a second moving part 52, the second housing part 56, a first passage 60, a second passage 61, a third passage 62, and a second spring 63.

The second coil 51 may generate a magnetic force as power is supplied. The second coil 51, according to some exemplary embodiments, is implemented as an electromagnet and is installed in the second housing part 56 in the circumferential direction.

The second moving part 52 is installed at a position facing the second coil 51, and linearly moved in the top-to-bottom direction (based on FIG. 3) by the operation of the second coil 51. The second moving part 52, according to some exemplary embodiments, includes a second flange 53, a second connecting shaft member 54, and a second opening/closing member 55. The second flange 53 is linearly moved by the operation of the second coil 51, the second connecting shaft member 54 is fixed to the second flange 53, moved with the second flange 53, and extended in the longitudinal direction of the second housing part 56. The second opening/closing member 55 is fixed to the second connecting shaft member 54 and opens/closes the first passage 60.

The second moving part 52 has a T-shaped structure, and the second flange 53 is moved in the top-to-bottom (e.g., longitudinal) direction by magnetization of the second coil 51. The second connecting shaft member 54 is formed in a rod shape and extended in the top-to-bottom direction, and the second opening/closing member 55 is positioned between the first stepped part 64 and the second stepped part 65 of the second housing part 56.

The second housing part 56 can be modified into various shapes, as long as the second housing part 56 is installed in a shape to cover the second coil 51 and the second moving part 52, and includes the first passage 60, which is open and formed on one side facing the second moving part 52.

The second housing part 56, according to some exemplary embodiments, includes a first body 57, a second body 58, and a third body 59. The first body 57 is installed in a shape to cover the first passage 60 and has the first stepped part 64 to which the second opening/closing member 55 moved in the forward direction (upward direction in FIG. 3) is locked (or abutted against). The second body 58 is installed next to the first passage 60 with the second passage 61 interposed therebetween, and has the second stepped part 65 to which the second opening/closing member 55 moved in the backward (or rearward) direction (downward direction in FIG. 2) is locked. The third body 59 is installed next to the second passage 61 with the third passage 62 interposed therebetween, and installed in a shape to cover the second flange 53 and the second coil 51.

The first passage 60, serving as a passage through which air is moved, is formed at the top of the first body 57, and is opened/closed by the second opening/closing member 55. As seen in FIG. 4B, since the second opening/closing member 55 is locked to the first stepped part 64 protruding to the inside of the first body 57, the first passage 60 is closed.

The second passage 61, serving as a passage through which air is moved, is formed at the bottom (based on FIG. 2) of the first body 57 along the circumference thereof. The second passage 61, according to some exemplary embodiments forms, a passage through which air is moved through a side surface of the second housing part 56.

The second body 58 is positioned under the first body 57, and has the second stepped part 65 to which the second opening/closing member 55 is locked when the second opening/closing member 55 is moved downward, such as illustrated in FIG. 3B. The second stepped part 65 protruding to the inside of the second body 58 is installed at a position facing the first stepped part 64 with the second opening/closing member 55 interposed therebetween.

The third passage 62 is installed at a position spaced apart from the second passage 61, and forms a passage through which air is moved through a side surface of the second housing part 56. The third passage 62, according to some exemplary embodiments, is positioned under the second passage 61, and forms a passage through which air is moved along the circumference of the third body 59, such as illustrated in FIG. 4B.

The second partition 15, for partitioning the first and third chambers 11 and 13, is positioned at a side surface of the second body 58 positioned between the second and third passages 61 and 62, and the movement of air is regulated while the second passage 61 is opened/closed by the movement of the second moving part 52. Since the second partition 15 is installed in a shape to cover the outside of the second body 58, the air in the first chamber 11 may be moved into the third chamber 13 through the second passage 61 and the third passage 62.

Hereafter, operational states of the multi-chamber type air spring device 1, according to some exemplary embodiments, will be described in more detail with reference to the accompanying drawings.

As illustrated in FIGS. 1 and 5, the first and second chambers 11 and 12 are used as chambers in a basic (or normal) mode, and the first and third chambers 11 and 13 are set to a soft mode or hard mode. Furthermore, no power is supplied to the multi-chamber type air spring device 1. When no power is supplied to the multi-chamber type air spring device 1, the chamber part 10 may maintain an intermediate characteristic.

As illustrated in FIGS. 4A, 4B, 7A, and 7B, the first and second opening/closing members 35 and 55 close the first flow path 40 and the first passage 60 through the operations of the first coil 31 and the second coil 51, respectively. That is, the first moving part 32 and the second moving part 52 are moved by the operations of the first coil 31 and the second coil 51, respectively. In this manner, the first spring 43 and the second spring 63 are compressed, and, thereby, configured to store energy to operate the multi-chamber type air spring device 1 in a powered-off state. Since the first partition 14 is installed at the side surface of the first housing 37 of the first valve 30, the air of the first chamber 11 is blocked by the first opening/closing member 35 and constrained from moving to the second chamber 12.

Furthermore, since the second partition 15 is installed at the side surface of the second body 58 of the second valve 50, the air of the first chamber 11 is moved into the second housing part 56 through the second passage 61 even though the second opening/closing member 55 closes the first passage 60. As such, air is moved into the third chamber 13 through the third passage 62.

The first and second valves 30 and 50, according to some exemplary embodiments, have the same configuration, but are mounted at different positions.

As illustrated in FIGS. 3A, 3B, 6A, and 6B, when no power is applied to each of the first and second valves 30 and 50, the first valve 30 is opened and the second valve 50 is closed via operations of the first and second springs 43 and 63. That is, the first moving part 32 and the second moving part 52 are moved downward by the operations (e.g., expansion) of the first spring 43 and the second spring 63, respectively. Therefore, the first opening/closing member 35 is locked to the second stepped part 65 of the first housing part 36. Therefore, the air of the first chamber 11 is moved into the first housing part 36 through the first flow path 40, and then moved into the second chamber 12 through the second flow path 41.

Furthermore, since the second opening/closing member 55 of the second valve 50 is locked to the second stepped part 65 of the second body 58, the air flowing into the second housing part 56 through the first and second passages 60 and 61 is blocked from moving to the third passage 62. Therefore, the air of the first chamber 11 is blocked by the second opening/closing member 55 and constrained from moving to the third chamber 13.

Furthermore, since power can be supplied to or removed from the first and second valves 30 and 50, the first and second valves 30 and 50 can be operate in various manners.

In accordance with various exemplary embodiments, even though no power may be supplied to a multi-chamber type air spring device 1, first and second valves 30 and 50 are opened/closed in an opposite way, and first and second chambers 11 and 12 may be connected to each other and used in a basic mode, which makes it possible to reduce power consumption. Furthermore, since an intermediate characteristic of the multi-chamber type air spring device 1 is set to the basic mode and the characteristics of the multi-chamber type air spring device 1 can be divided into a hard mode or soft mode, it is possible to secure the ride quality and stability of the entire system even in an emergency condition where no power is supplied. Furthermore, since only the mounting positions of the valves used in the valve part 20 are changed while the valves are otherwise the same, the valve part 20 can be operated in various modes. This makes it possible to reduce the cost and to increase the degree of freedom in design.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A multi-chamber air spring device comprising:
a chamber part partitioned into spaces; and
a valve part configured to control movement of air through an internal boundary of the chamber part via valves,
wherein, in a powered-off state of the valve part, the valves are in different opened/closed states from one another, and
wherein, in a powered-on state of the valve part, the valves are in different opened/closed states from one another.

2. The multi-chamber air spring device of claim 1, wherein the chamber part comprises:
a first chamber configured to store air;
a second chamber connected to the first chamber; and
a third chamber connected to the first chamber.

3. The multi-chamber air spring device of claim 2, wherein the valves comprise:
a first valve configured to control movement of air between the first chamber and the second chamber; and
a second valve configured to control movement of air between the first chamber and the third chamber.

4. The multi-chamber air spring device of claim 3, wherein: an end of the first valve is mounted at a different distance from the internal boundary than a corresponding end of the second valve.

5. The multi-chamber air spring device of claim 3, wherein:
no power is supplied to the first and second valves in the powered-off state; and in the powered-off state, the opened/closed states of the first and second valves are opposite one another.

6. A multi-chamber air spring device, comprising:
a chamber part partitioned into spaces, the chamber part comprising:
a first chamber configured to store air;
a second chamber connected to the first chamber; and
a third chamber connected to the first chamber;
a valve part configured to control movement of air through an internal boundary of the chamber part via solenoid valves, the solenoid valves comprising:
a first solenoid valve configured to control movement of air between the first chamber and the second chamber; and
a second solenoid valve configured to control movement of air between the first chamber and the third chamber,
wherein, in a powered-off state of the first and second solenoid valves, the first and second solenoid valves are in different opened/closed states from one another.

7. The multi-chamber air spring device of claim 3, wherein the first valve comprises:
a first coil configured to generate a magnetic force in response to applied power;
a first moving part facing the first coil and configured to move linearly in response to operation of the first coil; and
a first housing part covering the first coil and the first moving part, the first housing part comprising:
a first flow path, which is open and formed at a side facing the first moving part;
a second flow path forming a passage through which air is selectively passed through a side surface of the first housing part; and
a third flow path spaced apart from the second flow path, the third flow path forming a passage through which air passes through the side surface of the first housing part.

8. The multi-chamber air spring device of claim 7, wherein the first moving part comprises:
a first flange configured to move linearly in response to the operation of the first coil;
a first connecting shaft member extending in a longitudinal direction of the first housing part and fixed to the first flange, the first connecting shaft member being configured to move with the first flange; and
a first opening/closing member fixed to the first connecting shaft member and configured to open/close an interface between the first flow path and the second flow path.

9. The multi-chamber air spring device of claim 8, wherein the first housing part comprises:
a first housing covering the first flow path and comprising a first stepped part, the first opening/closing member being configured to abut against the first stepped part in a forward position of the first connecting shaft member;
a second housing adjacent to the first flow path with the second flow path interposed therebetween and comprising a second stepped part, the first opening/closing member being configured to abut against the second stepped part in a rearward position of the first connecting shaft member; and
a third housing adjacent to the second flow path with the third flow path interposed therebetween, the third housing covering the first flange and the first coil.

10. The multi-chamber air spring device of claim 9, wherein:
the chamber part comprises a first partition partitioning the first chamber and the second chamber, the first partition interfacing with a side surface of the first housing; and
the first moving part is configured to open/close the interface between the first flow path and the second flow path to regulate the movement of the air between the first chamber and the second chamber.

11. The multi-chamber air spring device of claim 3, wherein the second valve comprises:
a second coil configured to generate a magnetic force in response to applied power;
a second moving part facing the second coil and configured to move linearly in response to operation of the second coil;
a second housing part covering the second coil and the second moving part, the second housing part comprising:
a first passage, which is open and formed at a side facing the second moving part;
a second passage forming a passage through which air passes through a side surface of the second housing part; and
a third passage spaced apart from the second passage, the third passage forming a passage through which air is selectively passed through the side surface of the second housing part.

12. The multi-chamber air spring device of claim 11, wherein the second moving part comprises:
a second flange configured to move linearly in response to the operation of the second coil;
a second connecting shaft member extending in a longitudinal direction of the first second housing part and fixed to the second flange, the second connecting shaft member being configured to move with the second flange; and
a second opening/closing member fixed to the second connecting shaft member and configured to open/close an interface between the second passage and the third passage.

13. The multi-chamber air spring device of claim 12, wherein the second housing part comprises:
a first body covering the first passage and comprising a first stepped part, the second opening/closing member being configured to abut against the first stepped part in a forward position of the second connecting shaft member;
a second body adjacent to the first passage with the second passage interposed therebetween and comprising a second stepped part, the second opening/closing member being configured to abut against the second stepped part in a rearward position of the second connecting shaft member; and
a third body adjacent to the second passage with the third passage interposed therebetween, the third body covering the second flange and the second coil.

14. The multi-chamber air spring device of claim 13, wherein:
the chamber comprises a second partition partitioning the first chamber and the third chamber, the second partition interfacing with a side surface of the second body; and
the second moving part is configured to open/close the interface between the second passage and the third passage to regulate the movement of the air between the first chamber and the third chamber.

15. The multi-chamber air spring device of claim 10, wherein the second valve comprises:
- a second coil configured to generate a magnetic force in response to applied power;
- a second moving part facing the second coil and configured to move linearly in response to operation of the second coil;
- a second housing part covering the second coil and the second moving part, the second housing part comprising:
- a first passage, which is open and formed at a side facing the second moving part;
- a second passage forming a passage through which air passes through a side surface of the second housing part; and
- a third passage spaced apart from the second passage, the third passage forming a passage through which air is selectively passed through the side surface of the second housing part.

16. The multi-chamber air spring device of claim 15, wherein the second moving part comprises:
- a second flange configured to move linearly in response to the operation of the second coil;
- a second connecting shaft member extending in a longitudinal direction of the first second housing part and fixed to the second flange, the second connecting shaft member being configured to move with the second flange; and
- a second opening/closing member fixed to the second connecting shaft member and configured to open/close an interface between the second passage and the third passage.

17. The multi-chamber air spring device of claim 16, wherein the second housing part comprises:
- a first body covering the first passage and comprising a first stepped part, the second opening/closing member being configured to abut against the first stepped part in a forward position of the second connecting shaft member;
- a second body adjacent to the first passage with the second passage interposed therebetween and comprising a second stepped part, the second opening/closing member being configured to abut against the second stepped part in a rearward position of the second connecting shaft member; and
- a third body adjacent to the second passage with the third passage interposed therebetween, the third body covering the second flange and the second coil.

18. The multi-chamber air spring device of claim 17, wherein:
- the chamber comprises a second partition partitioning the first chamber and the third chamber, the second partition interfacing with a side surface of the second body; and
- the second moving part is configured to open/close the interface between the second passage and the third passage to regulate the movement of the air between the first chamber and the third chamber.

19. A gas spring comprising:
- a first chamber;
- a second chamber interfacing with the first chamber;
- a third chamber interfacing with the first chamber and adjacent to the second chamber;
- a first valve configured to control movement of gas through a first boundary between the first chamber and the second chamber via a first structure; and
- a second valve configured to control movement of gas through a second boundary between the first chamber and the third chamber via a second structure, the second structure being equivalent to the first structure,
- wherein, in a powered-off state of the gas spring, an open condition of the first valve is opposite an open condition of the second valve.

20. The gas spring of claim 19, wherein:
- the open condition of the first valve is controlled, at least in part, according to a first distance of an end of the first valve from the first boundary; and
- the open condition of the second valve is controlled, at least in part, according to a second distance of a corresponding end of the second valve from the second boundary, the second distance being different from the first distance.

* * * * *